US009723536B2

(12) United States Patent
Wang et al.

(10) Patent No.: US 9,723,536 B2
(45) Date of Patent: Aug. 1, 2017

(54) WIRELESS COMMUNICATION SYSTEM UTILIZING BROADCAST-BASED BLIND OFFLOADING

(71) Applicant: Avago Technologies General IP (Singapore) Pte. Ltd., Singapore (SG)

(72) Inventors: Shao-Cheng Wang, Santa Clara, CA (US); Pavan Nuggehalli, Mountain View, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 52 days.

(21) Appl. No.: 14/156,960

(22) Filed: Jan. 16, 2014

(65) Prior Publication Data

US 2014/0200008 A1 Jul. 17, 2014

Related U.S. Application Data

(60) Provisional application No. 61/753,780, filed on Jan. 17, 2013.

(51) Int. Cl.
*H04Q 7/10* (2006.01)
*H04W 36/38* (2009.01)
(Continued)

(52) U.S. Cl.
CPC ........... *H04W 36/38* (2013.01); *H04W 36/22* (2013.01); *H04W 36/14* (2013.01); *H04W 48/12* (2013.01)

(58) Field of Classification Search
CPC ..... H04W 36/14; H04W 48/16; H04W 48/20; H04W 36/02
(Continued)

(56) References Cited

U.S. PATENT DOCUMENTS 6,438,377 B1 * 8/2002 Savolainen ........... H04W 36/30
370/332
7,957,349 B2 * 6/2011 Kim ..................... H04W 36/02
370/331
(Continued)

FOREIGN PATENT DOCUMENTS

CN 101361382 A 2/2009
EP 1058473 A1 12/2000
(Continued)

OTHER PUBLICATIONS

IEEE 802.11u-2011, IEEE Standard for Information Technology—Telecommunications and information exchange between systems—Local and Metropolitan networks—specific requirements—Part 11: Wireless LAN Medium Access Control (MAC) and Physical Layer (PHY) specifications: Amendment 9: Interworking with External Networks, dated Feb. 25, 2011; 190 pages.
(Continued)

*Primary Examiner* — Ajit Patel
*Assistant Examiner* — Julio Perez
(74) *Attorney, Agent, or Firm* — Sterne, Kessler, Goldstein & Fox P.L.L.C.

(57) ABSTRACT

In an Long Term Evolution (LTE) environment, LTE base stations may collect relevant data from subscribing wireless devices, as well as from nearby LTE base stations and WLAN access points. Based on the collected data, as well as data of the base station itself, the base station may make a determination as to whether to institute offloading of some or all of the subscribing UEs. Rather than independently communicating the offload command to each of the UEs, the base station may issue a broadcast notification that may be decoded by all of the UEs for performing offloading. In order to mitigate a surge of offloading, the base station can
(Continued)

include surge prevention parameters in the broadcast message to distribute or reduce offloading.

21 Claims, 8 Drawing Sheets

(51) Int. Cl.
*H04W 36/22* (2009.01)
*H04W 36/14* (2009.01)
*H04W 48/12* (2009.01)

(58) Field of Classification Search
USPC ....... 455/436, 437, 438, 439, 442, 443, 444; 370/331, 332
See application file for complete search history.

(56) References Cited

U.S. PATENT DOCUMENTS

| | | | |
|---|---|---|---|
| 2002/0051431 A1* | 5/2002 | Choi | H04W 36/0072 370/331 |
| 2004/0090935 A1 | 5/2004 | Courtney | |
| 2008/0268844 A1 | 10/2008 | Ma et al. | |
| 2010/0003980 A1 | 1/2010 | Rune et al. | |
| 2010/0323734 A1 | 12/2010 | Kawaguchi | |
| 2012/0324100 A1 | 12/2012 | Tomici et al. | |
| 2013/0012251 A1* | 1/2013 | Roddy | H04W 28/08 455/509 |
| 2013/0023302 A1* | 1/2013 | Sivanesan | H04W 36/32 455/525 |
| 2013/0094472 A1 | 4/2013 | Klingenbrunn et al. | |
| 2013/0260736 A1 | 10/2013 | Amerga et al. | |
| 2014/0199996 A1 | 7/2014 | Wang et al. | |

FOREIGN PATENT DOCUMENTS

| | | | |
|---|---|---|---|
| EP | 2222107 A1 | 8/2010 | |
| GB | 2489553 A | 10/2012 | |
| WO | WO 2011/094933 A1 | 8/2011 | |

OTHER PUBLICATIONS

IEEE 802.11-2012, IEEE Standard for Infmination technology—Telecommunications and information exchange between systems Local and metropolitan area networks—Specific requirements Part 11: Wireless LAN Medium Access Control (MAC) and Physical Layer (PHY) Specifications; 2793 pages.

3rd Generation Partnership Project; Technical Specification Group Radio Access Network; Evolved Universal Terrestrial Radio Access (E-UTRA); Radio Resource Control (RRC); Protocol specification (Release 12.0.0), dated Dec. 2013; 349 pages.

3rd Generation Partnership Project; Technical Specification Universal Mobile Telecommunications System (UMTS); LTE; 3GFP system to Wireless Local Area Network (WLAN) interworking; System description (3GPP TS 23.234 version 11.0.0 Release 11), dated Sep. 2012; 86 pages.

3rd Generation Partnership Project; Technical Specification Universal Mobile Telecommunications System (UMTS); LTE; Non-Access-Stratum (NAS) protocol for Evolved Packet System (EPS); Stage 3 (3GPP TS 23.301 version 11.9.0 Release 11), dated Jan. 2014; 334 pages.

3rd Generation Partnership Project; Technical Specification LTE; Evovled Uniseral Terrestrial Radio Access (E-UTRA); LTE Positioning Protocol (LPP) (3GPP TS 36.355 version 11.5.0 Release 11), dated Jan. 2014; 120 pages.

European Search Report and Authority directed to related European Patent Application No. 14000176.9, mailed May 19, 2014; 7 pages.

European Search Report directed to related European Patent Application No. 14000177.7, mailed Aug. 18, 2014; 3 pages.

European Search Report directed to related European Patent Application No. 14000177.7, mailed Aug. 26, 2014; 8 pages.

First Office Action (with English language translation) directed to related Chinese Patent Application No. 2014123229.7, mailed Nov. 1, 2016.

Office Action directed to related European Patent Publication No. EP2757829, mailed Feb. 25, 2016.

* cited by examiner

WIRELESS COMMUNICATION SYSTEM UTILIZING BROADCAST-BASED BLIND OFFLOADING

CROSS-REFERENCED TO RELATED APPLICATIONS

This patent application claims the benefit of U.S. Provisional Patent Application No. 61/753,780, filed Jan. 17, 2013, entitled "Wireless Communication System Utilizing Broadcast-Based Blind Offloading," which is incorporated herein by reference in its entirety.

BACKGROUND

Technical Field

This disclosure relates to offloading communications traffic from a base station, including, to one or more wireless local area network (WLAN) access points within a communications environment.

Related Art

Wireless communication devices, such as cellular telephones to provide an example, have become commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, the wireless communication device will continuously detect and measure connection characteristics in order to make a determination as to whether it should remain connected to a current base station, or switch to a different base station. Also, when a determination has been made to offload, conventional wireless communication systems use unicast signaling to communicate offload triggers and configurations between a User Equipment (UE) and a network.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
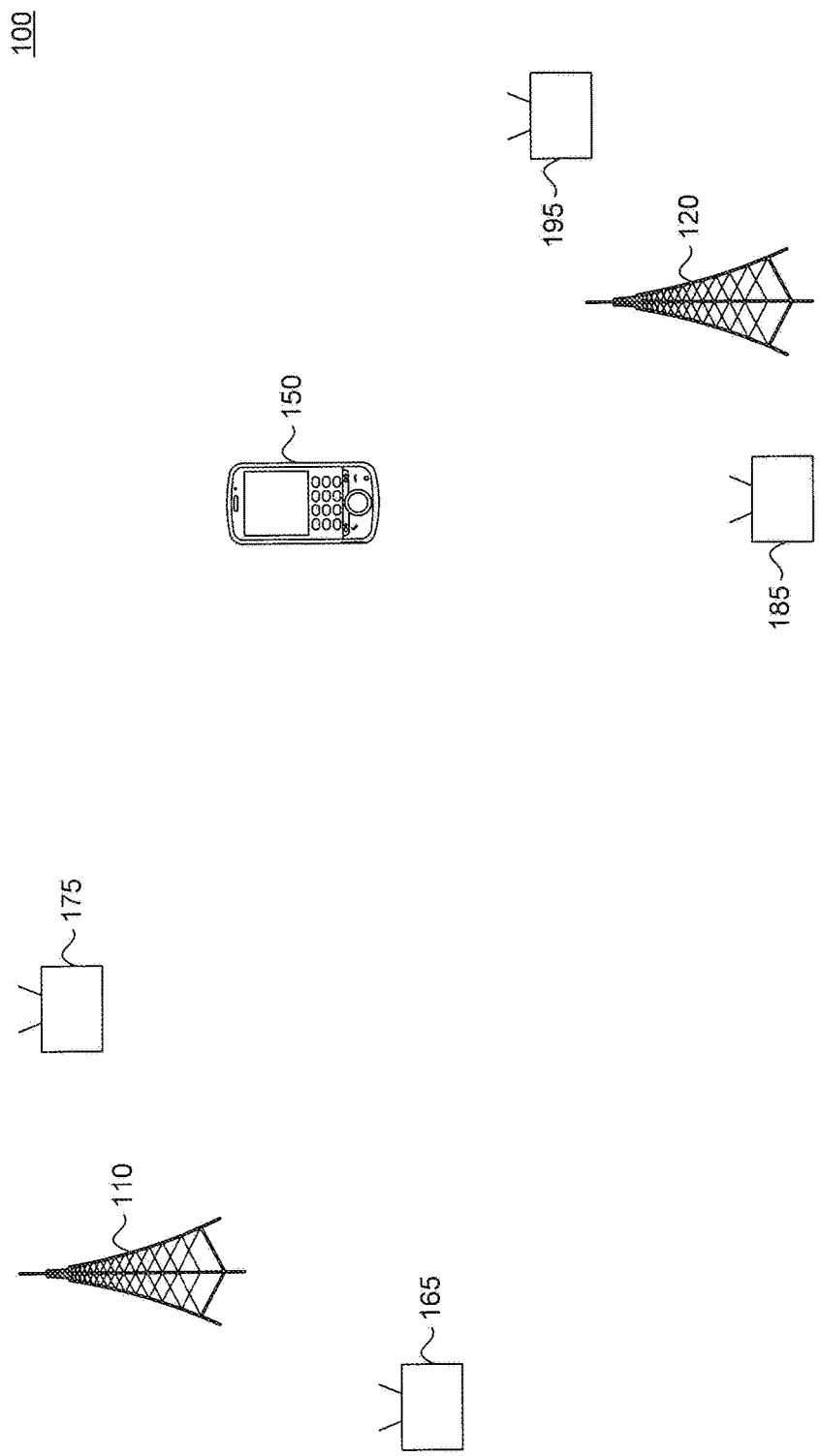
FIG. 1 illustrates a diagram of an exemplary wireless communication environment.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B," "evolved Node B (eNode B)," home Node B (HNB)," "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

Although several portions of the description of the present disclosure may be described in terms of wireless devices (specifically cellular devices), those skilled in the relevant art(s) will recognize that the present disclosure may be applicable to any other devices without departing from the spirit and scope of the present disclosure.

An Exemplary Wireless Communication Environment

FIG. 1 illustrates an exemplary wireless communication environment 100. In the environment 100, there may be included one or more base stations, such as base stations 110 and 120. Although the base stations may be termed differently in the art depending on their corresponding radio access technology (e.g., eNodeB for 4G, etc.), for purposes of this disclosure they will collectively be referred to as "base stations." In addition to the base stations, the environment 100 may also include one or more WLAN access points, such as access points 165, 175, 185 and 195.

In the environment 100, a user equipment (UE) 150 connects to one of the base stations (e.g., base station 120). As discussed above, conventionally, while the UE 150 is connected to the base station 120, the UE will continuously measure connection characteristics of the serving base station 120, as well as other nearby base stations (e.g., base station 110). From the characteristics, the UE 150 can make determinations as to whether to offload from the serving base station 120 to the nearby base station 110.

However, according to an embodiment, the serving base station 120 acquires information from the UE 150, as well as nearby base stations and/or access points in order to make the offloading determination. In this manner, whereas conventionally the UE is tasked with performing a substantial portion of the offloading calculations, those calculations can now be performed by the network and its hardware. In this manner, the UE 150 consumes less power and can utilize its processor for alternative tasks.

Figure 2:
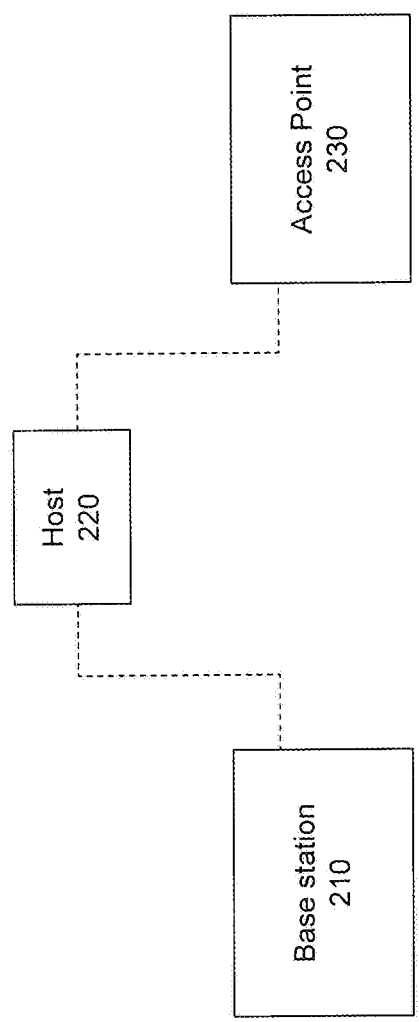
FIG. 2 illustrates a block diagram of an exemplary base station and access point within an exemplary wireless communication environment.

FIG. 2 illustrates a block diagram of an exemplary base station 210 and WLAN access point 230. In an embodiment, the base station 210 and the WLAN access point 230 can be connected by a host 220. The host 220 can perform coordinated control of the base station 210 and the WLAN access point 230, and/or represent a communication link between the base station 210 and the access point 230. In this configuration, the base station 210 can acquire information from the access point 230 to assist with the offloading decision-making.

In an embodiment, the base station 210 can instruct one or more UEs in the wireless communication environment to offload from the base station 210 to the WLAN access point 230.

Exemplary Base Station

Figure 3:
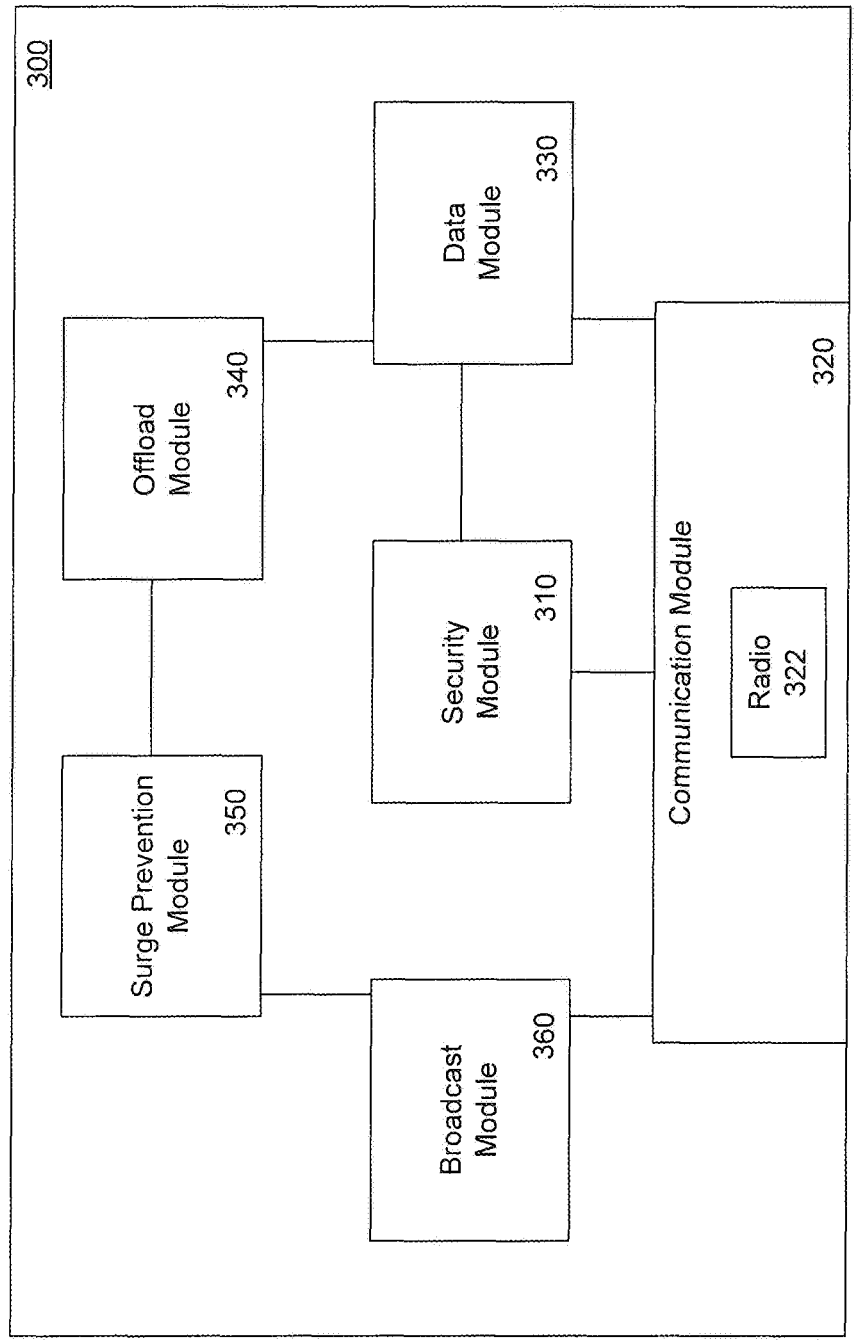
FIG. 3 illustrates a block diagram of an exemplary base station.

FIG. 3 illustrates a block diagram of an exemplary base station 300. The base station 300 includes a security module 310, a communication module 320, a data module 330, an offload module 340, a surge prevention module 350, and a broadcast module 360, all or some of which can be executed utilizing one or more processors or circuits. For example, all or some of the modules of base station 300 can be implemented using one or more processor(s) and/or state machine logic and/or circuits, or a combination thereof, programmed or implemented to have the functionality described herein. Although separate modules are illustrated in FIG. 3, the disclosure is not so limited, as will be understood by those skilled in the arts. The modules can be combined in one or more modules, and can be implemented by software, hardware, or a combination thereof.

The communication module 320 includes a radio 322 that is configured to communicate with UEs, base stations, and access points in the environment 100. The radio 322 can include both a transmitter and receiver to effect communications. The communication module 320 acquires data from the other devices in the environment 100 for use in the offloading determination, issues offloading triggers and/or commands to UEs in the environment 100, and can also perform dedicated communication with any UEs in the environment 100, as will be discussed in further detail below.

Offloading Determination

In operation, the data module 330 acquires connection characteristics from one or more devices in the environment. Such characteristics may include the loading of the network (as determined from the base station 300), the loading of the WLAN network (as determined from one or more WLAN access points), and signal strength or other connection characteristics of the UE in question. Once the necessary information has been acquired, the data module 330 provides this information to the offload module 340. The loading of the WLAN network may be received by a network backhaul, such as host 220, in FIG. 2, or by some other means.

The offload module 340 uses the acquired information to make a determination as to whether to perform offloading. In an embodiment, the offload module 340 can use the acquired information to set offloading triggers. These offloading triggers can be supplied to the UEs in the environment 100 to set conditions by which they can perform offloading, or can be used by the base station to determine when to signal to the UEs in the environment 100 to perform offloading. One example of the offloading triggers that can be supplied to the UEs is a Long Term Evolution (LTE) signal strength threshold and/or WLAN signal strength threshold. The UE can compare its current signal strength to those provided, e.g. LTE signal strength threshold, and perform offloading when the UE signal strength falls below the threshold.

Once the offload module 340 determines that one or more UEs should be offloaded from the base station to a WLAN access point, the offload module 340 provides an offloading notification to the broadcast module 360.

Offload Command

When the base station 300 seeks to inform subscribing UEs of an offload command and/or offloading triggers, the broadcast module 360 generates a broadcast message, which the communication module 320 can broadcast to the environment 100. This broadcast message can be detected by any or all of the subscribing UEs in order to notify those UEs that of the offloading command and/or offloading triggers.

As discussed above, most conventional wireless intersystem offloading solutions use unicast signaling to communicate offload triggers and configurations between a UE and the network. However, in an embodiment, a broadcast-based message can be used to quickly and efficiently notify relevant UEs. For example, in an LTE system, the offload command can be piggybacked on a System Information Block (SIB) messages already existing in the LTE framework. SIB messages are normally transmitted "broadcast" style in a pre-scheduled manner by a base station to communicate connection information necessary for UEs to connect to the base station and corresponding network. (Herein, standards related messages, are italicized, for ease of understanding.) Further, herein "broadcast" communications are transmitted with an address available to all subscribing UEs, whereas "dedicated" or unicast communications are addressed to a particular UE or group of UEs. Herein, the SIB messages are modified to include the offload command, which can contains relevant access network information at the offload side. For example, when the target offload system is WLAN, the offload command can contain WLAN channels, a service set identifier (SSID) or basic service set identifier (BSSID), and/or a list of SSIDs/BSSIDs, to allow the UE to quickly identify the connection characteristics associated with a target. Additionally, or alternatively, the offload command can contain a list of HESSIDs or "Roaming Consortium." (See e.g. 802.11u-2011—IEEE Standard for Information Technology—Telecommunications and information exchange between systems—Local and Metropolitan networks—specific requirements—Part II: Wireless LAN Medium Access Control (MAC) and Physical Layer (PHY) specifications: Amendment 9: Interworking with External Networks, incorporated herein by reference in its entirety).

Figure 4:
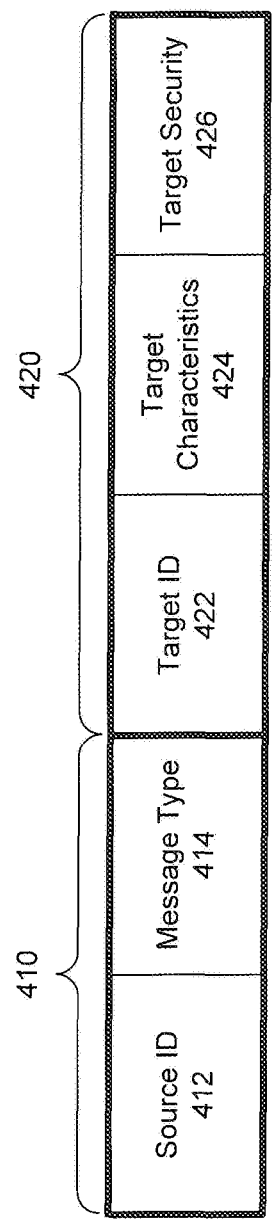
FIG. 4 illustrates a block diagram of an exemplary broadcast message transmitted by the base station.

FIG. 4 illustrates an exemplary broadcast message 400 that may be transmitted by the base station 300 using the SIB framework. The broadcast message includes a header portion 410 and a payload portion 420. In an embodiment, the header portion 410 includes a source ID 412 and a message type 414, and the payload portion 420 may include one or more target IDs 422, corresponding target characteristics 424, and corresponding target security information 426. In an embodiment in which the base station transmits offloading triggers, the payload portion also includes the trigger conditions. In an embodiment, the payload portion 420 may also include surge prevention parameters.

The header portion 410 and the payload portion 420 of the broadcast message 400 are standardized elements of LTE, but these elements included within those portions are customized according to the present disclosure for facilitating the offloading functionality described herein. The source ID 412 identifies the source base station issuing the broadcast message. This allows the UEs receiving the message to identify whether the message has been sent from the base station to which they are subscribed. The message type 414 identifies the message as an offloading message and describes the locations of specific information located in the message, which allows the UEs to accurately decode and decipher the message.

The payload portion 420, on the other hand, includes one or more target IDs 422, which identifies the target access points or base stations to which the designated UEs should offload. The target characteristics 424 include connection details of the targets identified by the target IDs. Also, the target security information 426 provides security information of the targets to facilitate efficient security access. As discussed above, the payload portion 420 may also include surge prevention parameters, which the UEs may utilize as part of a surge prevention method devised by the broadcasting base station, as will be discussed in further detail below.

When the base station 300 has identified a target to which the UE will offload, in an embodiment, the base station 300 can acquire security information of the target, and provide that security information to the UE for streamlining the offloading process and minimizing the downtime for the UE. However, as some security parameters, such as network access keys are sensitive, they may only be broadcast when the cellular broadcast channels are encrypted.

If the broadcast channels are encrypted, security parameters such as WEP/WPA (for WLAN offload) can be included in the broadcast offload command. On the other hand, if the broadcast channels are not encrypted, the base station can employ an alternative communication procedure to provide the sensitive information. In an embodiment, the broadcast module 360 can prepare a broadcast message that includes any non-sensitive target information for broadcasting to the environment 100 without encryption. Additionally, the security module 310 packages sensitive security information with encryption, which the communication module 320 transmits to offload UEs through dedicated signaling.

In an alternative embodiment, the security information of any targets can be communicated to the subscribing UEs via dedicated signaling, and the broadcast messages can be reserved for non-security information. Regardless of whether all, some, or none of the security information is provided to the UE, in an embodiment, the base station 300 can provide the security information in advance of any offloading so as to allow for quick transitioning by the UE to a target connection. For example, when a UE initially attaches to the serving base station, or at the outset of the offloading process, the base station 300 can provide those UEs with the encrypted sensitive security information of the targets via Non-Access Stratum (NAS), Radio Resource Control (RRC), or other dedicated messages.

Surge Prevention

In an embodiment, once the offload module 340 has determined the offloading parameters and/or that offloading should be performed, the broadcast module 360 can generate the broadcast message to include surge prevention mechanisms based on information received from the surge prevention module 350.

For example, when the base station 300 broadcasts an offloading message, without surge prevention, this could cause a mass exodus of subscribing UEs to nearby access points. This not only could cause underutilization of the current base station, but could also quickly overload the target station. Therefore, in an embodiment, the surge prevention module 350 detects potential surges and devises one or more conditions or timing constraints to prevent such surges.

In an embodiment, the offload-capable UEs in the network act upon the offload command when it becomes "effective." In LTE, this means that the UEs start the offloading procedure at a next SIB modification boundary or some other timing as may be specified in the LTE standard or by the broadcast message, as defined by the surge prevention module 350.

When the surge prevention module 350 predicts an offload surge, it notifies the broadcast module 360. In turn, the broadcast module 360 modifies its broadcast message to include one or more offloading parameters, depending on a surge prevention method employed.

In an embodiment, the broadcast module 360 employs an "access class barring" (ACB) surge prevention method. Each UE is randomly assigned an access class, either at manufacturing or based on their SIM card or other hardware identifier. In the ACB method, the broadcast module 360 includes one or more access classes that are to participate in the offload. For example, if there exists 10 predefined classes, the broadcast message may be constructed to identify a subset (e.g., 5) of those classes for offloading. When the broadcast message is received by the UEs, those UEs decipher the message and determine whether their access class has been identified. The UEs whose access classes match one of those listed in the broadcast message then perform offloading according to the remainder of the message, as will be described in further detail below. In an embodiment, the ACB method can be modified to include time parameters associated with each of the classes to identify when those individual classes should perform their respective offloading operations.

In another embodiment, the broadcast module 360 employs random distribution method. In this method, the base station identifies a random backoff parameter, such as time, so that the UEs will perform distributed offloading. For example, the base station can identify a time range, such as $0 \leq t \leq T$ seconds, and include the range with the broadcast message. Upon receipt, the UEs each independently generate a random number within the identified range. Using their respective random numbers, the UEs proceed to perform offloading in accordance with their randomly generated time. To provide an example, if the base station identifies a 100 s time rage, a UE may randomly select second 56 from the range. Then, after waiting 56 seconds, the UE will begin to perform offloading. This causes the various UEs to randomly perform offloading, and therefore the offloading is performed in a distributed fashion. In an additional embodiment, the broadcast module 360 employs both the access class method and the random distribution method, so that the UEs perform both methods in sequential manner, for example.

In an embodiment, rather than including the surge prevention parameters in the broadcast message, the base station 300 can notify the corresponding UEs using any of the dedicated signaling described above. In another embodiment, surge prevention methods and parameters can be determined in advance, and hard-coded into the UE, either in its SIM or BIOS, or other hardware. Using these techniques, the UEs can prevent a surge from performing offloading from a broadcast notification.

An Exemplary User Equipment

Figure 5:
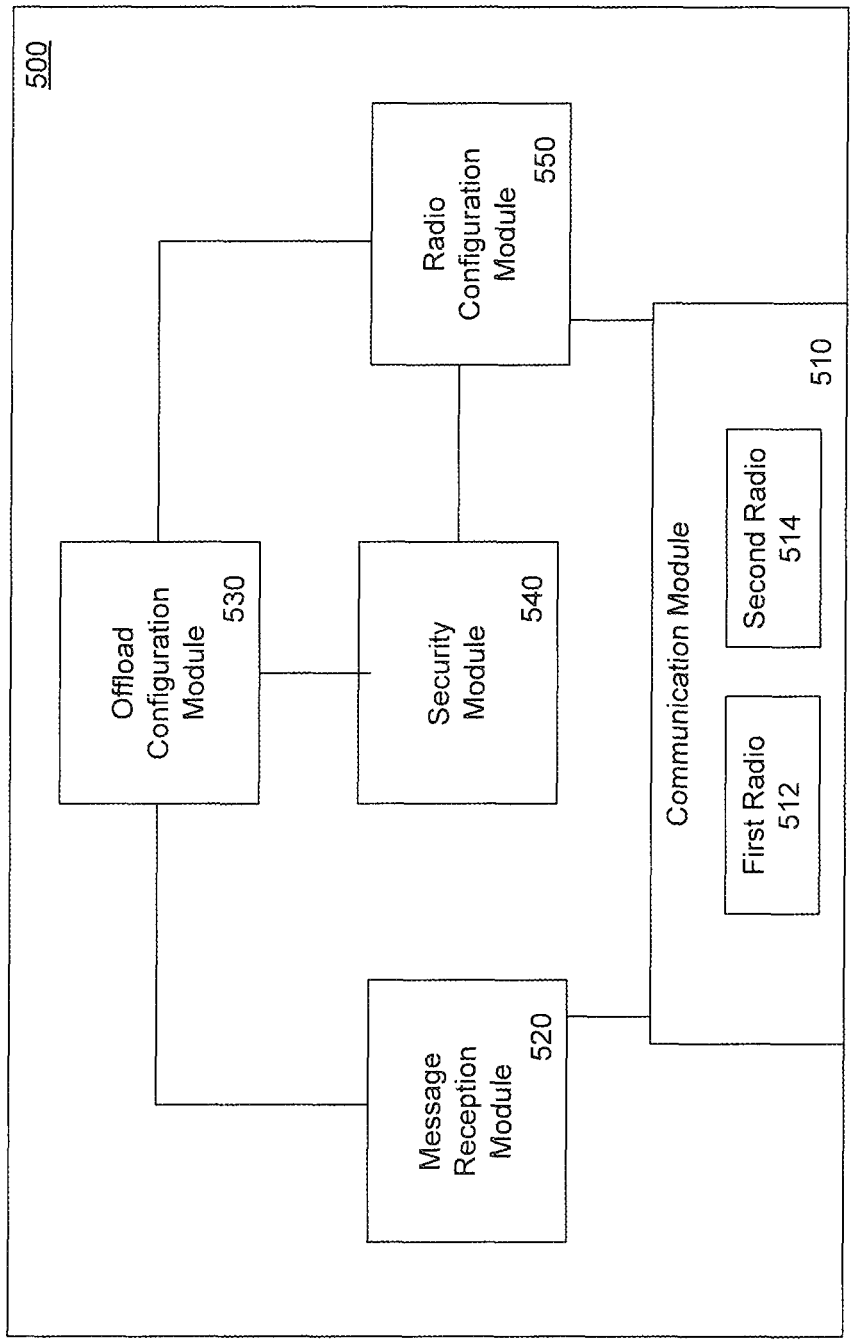
FIG. 5 illustrates a block diagram of an exemplary wireless communication device.

FIG. 5 illustrates a block diagram of an exemplary user equipment (UE) 500 that can be one embodiment of UE 150. The UE includes a communication module 510, a message reception module 520, an offload configuration module 530, a security module 540, and a radio configuration module 550, all or some of which can be executed utilizing one or more processors and/or circuits. For example, all or some of the modules of the user equipment 500 can be implemented using one or more processor(s) and/or state machine logic and/or circuits, or a combination thereof, programmed or implemented to have the functionality described herein. Although separate modules are illustrated in FIG. 5, the disclosure is not so limited, as will be understood by those skilled in the arts. The modules can be combined in one or more modules, and can be implemented by software, hardware, or a combination thereof.

The communication module 510 is configured to receive the broadcast message, and any dedicated signaling messages, from the base station, as well as to communication with any target access points upon offload initiation. In an embodiment, the base station operates according to a first RAT, e.g. a cellular carrier standard, such as LTE, 4G, 3G, among others. Accordingly, the communication module 510 includes a first radio 512 having a transmitter and receiver for effecting the cellular communications with the base station. Further, the communication module 510 includes a second radio 514 having a transmitter and receiver for effecting communications with the offload technology that is a different RAT from the cellular RAT, e.g. WLAN.

The communication module 510 forwards the received messages from the base station to the message reception module 520. The message reception module 520 deciphers the received broadcast message based on the header portion, and forwards the extracted offloading information to the offload configuration module 530. The offload configuration module 530 first determines whether the UE 500 is included within the offloading instruction. For example, if the base station has forwarded access class parameters, the offload configuration module 530 extracts the UE's access class from internal device hardware or a SIM card.

If the offload configuration module 530 determines that it is included within the offload instruction, then the offload configuration module may next determines when it should perform offloading based on surge prevention parameters included within the broadcast message. For example, if a random distribution method is employed, the offload configuration module 530 generates a random number within the range identified within the broadcast message. The offload configuration module 530 then waits the time determined by the randomly generated number before instructing the radio configuration module to perform the offloading.

Once the offload configuration module 530 has determined that offloading is to be performed, it notifies the radio configuration module 550 to perform the offloading operation. The radio configuration module 550 tunes the radio 514 included within the communication module 510 to the channel/frequency associated with the target access point identified in the broadcast message. The radio 514 may include both a transmitter and receiver (e.g. transceiver) for communication with the target access point. As part of the offloading, the radio configuration module 550 may also acquire security parameters from the security module 540 for authenticating with the target. In an embodiment, the security parameters can be extracted from the broadcast message.

Affect on LTE Standard

In order to implement the above-described configurations, it may be advantageous to alter and/or revise the LTE specification, as detailed below.

As discussed above, a change to the current LTE specification is the modification of the SystemInformation Block (SIB) messages, which should be enhanced to carry offload command contents as described above. The content can be carried either in existing SIB Information Elements (IEs) or in a new SIB IE. The contents of the SIB messages can include (1) WLAN channel; (2) BSSID and SSID; and optionally include (3) Security parameters; (4) access classes and/or backoff parameters; LTE signal strength threshold; LTE network load; and WLAN-side loading.

Any one or multiple pieces of this information can be used by the UEs for calculating when to offload to the target access point. For example, the UE can compare its current signal strength to the LTE signal strength threshold, and offload when its signal strength falls below the threshold. The UE can also perform offloading calculations based on the LTE network load or the WLAN-side loading. A combined algorithm can utilize more than one of these data elements for calculating an overall offloading determination.

In an embodiment, the behavior of the LTE UEs upon receiving the SIB messages carrying offload commands can be specified in the modified LTE specification. In an embodiment, when the network includes the broadcast commands in the SIB messages, the network and UEs can follow SIB modification/notification procedures specified in 3GPP TS 36.331, which is incorporated herein by reference. For example, the network may notify the UEs about the SIB changes via LTE's paging message and change of value tag in SIB1, where the value tag indicates a change in an upcoming SIB message(s) so that UEs are on notice. Upon a next SIB modification boundary, the network transmits the updated SIB message, which includes the offload command(s) according to embodiments herein. All, or a portion of WLAN offload capable UEs in the network can then start association procedures to offload at the next SIB modification boundary.

In another embodiment, the network can follow Earthquake and Tsunami Warning service (ETWS) and/or Commercial Mobile Alert Service (CMAS) notification procedures defined in 3GPP TS 36.331, in which the notification can occur at any point in time. The paging message is used to inform WLAN offload capable UEs in RRC_IDLE and UEs in RRC_CONNECTED about the presence of an offload command notification. If the UE receives a paging message including the "offload-indication," it shall start receiving the offload command information according to SchedulingInfoList contained in the SystemInformationBlockType1. In other words, the UE will receive the offload command information in a future SIB message, scheduled according to the SchedulingInfoList. If the UE receives a paging message including the "offload-Indication" while it is acquiring offload command notification(s), the UE shall continue acquiring offload command notification(s) based on the previously acquired SchedulingInfoList until it re-acquires SchedulingInfoList in SystemInformationBlockType1. In this case, offload command notification is contained in a new SIB IE. The paging message also should be modified to accommodate the new "offload-Indication."

Another possible modification that may be made is that the network may broadcast, together with the offload command, a timestamp identifying a time at which the offload command takes effect. In an embodiment, this timestamp can be an LTE System Frame Number (SFN).

Also, as discussed above, several scenarios may occur in which the network employs the use of LTE RRC and NAS messages for dedicated signaling to UEs. In an embodiment, at least some LTE RRC and NAS messages are changed to support the mechanisms proposed above in order to deliver sensitive security parameters and backoff parameters to the offload UE.

An Exemplary Method of Offloading Subscriber User Equipment by a Base Station

Figure 6:
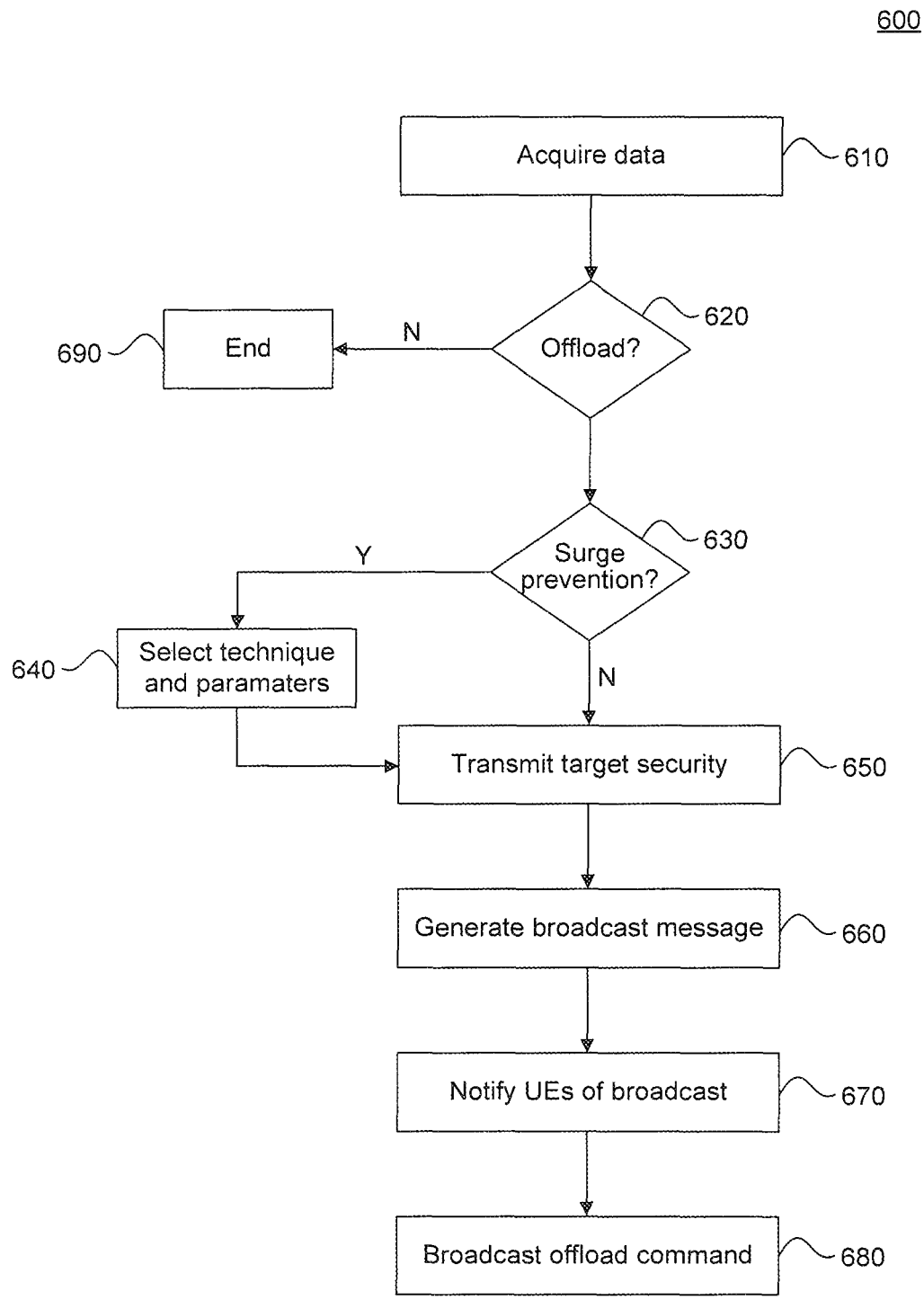
FIG. 6 illustrates a flowchart diagram of a method for issuing an offload instruction.

FIG. 6 illustrates a flowchart diagram of an exemplary method 600 of offloading subscriber UEs from a base station. In the method 600, the base station acquires relevant data (610) from itself and its network, as well as from nearby devices, such as UEs, WLAN Access Points, and/or other base stations. Using the acquired information, the base station performs an offload determination (620), in which the base station determines whether UEs should be offloaded therefrom. If it is determined that no offload is necessary (620—N), the method ends and no offload command is issued.

On the other hand, if the base station determines that offloaded is needed (620—Y), the base station next makes a determination (630) as to whether a surge prevention is needed as part of the offloading. If the base station determines that surge prevention is needed (630—Y), the base station proceeds to select a surge prevention technique and corresponding parameters suitable to the selected technique (640).

Once the technique and parameters have been selected, or if the base station determines that no surge prevention is needed (630—N), the base station separately transmits sensitive security information (650) via dedicated signaling to the relevant UEs. The base station may then generate the broadcast message (660) in accordance with the format described above, and including all the relevant information in accordance with the decisions made at earlier parts of the method and as described throughout this disclosure. For example, the broadcast message with the offloading parameters may be incorporated with in the pre-scheduled SIB messages that are sent to all subscribing UEs in LTE, or the paging messages also utilized in LTE.

Once the message has been prepared, the base station notifies the UEs of the incoming broadcast message (670) using either of the messaging techniques described above and then broadcasts the broadcast message (680) to the environment at a relevant time for capture by UEs in the environment. For example, the base station can use the modified SIB messages that are pre-scheduled in LTE as discussed above. Alternatively, the base station can use a paging notification for UEs that are already connected to the base station.

Those skilled in the relevant art(s) will recognize that the above method can additionally or alternatively include any of the functionality of the base station 300 discussed above, as well as any of its modifications. Further, the above description of the exemplary method should neither be construed to limit the method nor the description of the base station 300.

Figure 7:
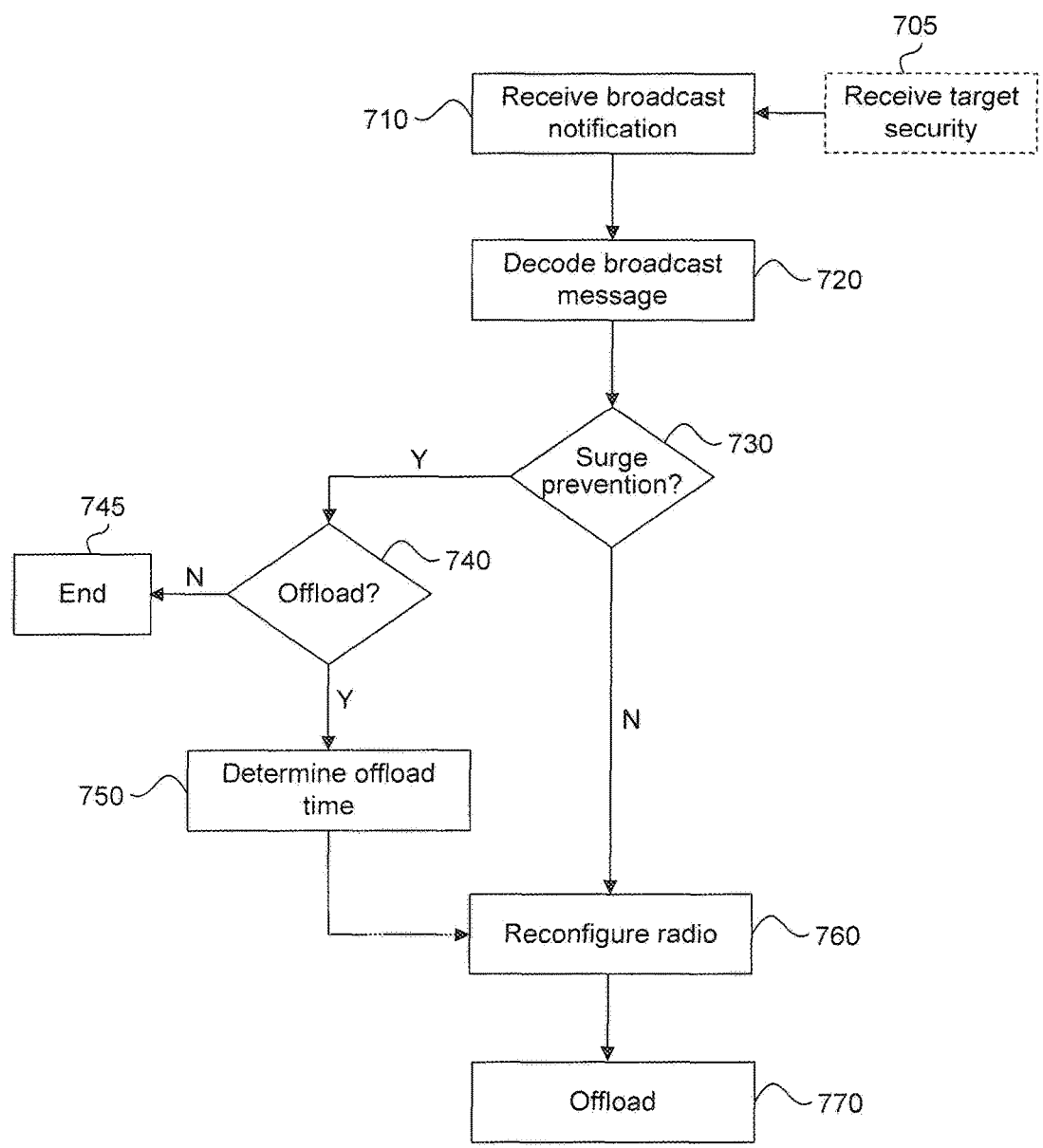
FIG. 7 illustrates a flowchart diagram of a method for performing offloading based on an offload instruction.

An Exemplary Method of Performing Offloading from a Base Station by User Equipment FIG. 7 illustrates a flowchart diagram of an exemplary method 700 for offloading from a current base station by a user equipment device.

In the method 700, the UE may receive target security information (705) via dedicated signaling. At some future point, the UE receives a broadcast notification from a serving base station (710). The UE then receives and decodes the broadcast message (720) according to the notification, and extracts relevant information, including target ID and channel, signal strength thresholds, surge prevention information, etc. If the broadcast message contains LTE and/or WLAN signal strength thresholds, the UE compares its current signal strength to the provided parameter, e.g. the LTE signal strength threshold, and performs offloading when the UE signal strength falls below the threshold. If the broadcast message contains no LTE and/or WLAN signal strength thresholds, then the UE can perform offloading as follows.

Once decoded, the UE makes a determination as to whether the base station has mandated surge prevention (730). If no surge prevention has been implemented (730—N), the UE proceeds to step 760, where it begins the offloading process, discussed below. On the other hand, if the UE determines that the base station has employed surge prevention, the UE next determines whether it is included within the offloading UEs (740). For example, if the base station has identified the use of access class surge prevention, then the UE will only offload if it is included within the identified access classes. If the UE is not designated for offloading (740—N), then the method ends (745).

On the other hand, if the UE is designated for offloading (740—Y), then the UE next determines an offload time (750). For example, if the UE's access class is included in the designated classes, or if no classes are specified (e.g., when using random distribution method), the UE determines that it is to offload and next detects a time (750) at which it should do so. If no time is specified (e.g., in access class surge prevention), the UE may offload immediately. Alternatively, after calculating an offload time according to the random distribution parameters set by the base station, the UE may then begin offloading.

Once the offload time has been determined, the UE may reconfigure its radio (760) at the relevant time according to the connection parameters included within the broadcast message, and then proceed to offload to the target (770).

Those skilled in the relevant art(s) will recognize that the above method can additionally or alternatively include any of the functionality of the user equipment 500 discussed above, as well as any of its modifications. Further, the above description of the exemplary method should neither be construed to limit the method nor the description of the user equipment 500.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 8:
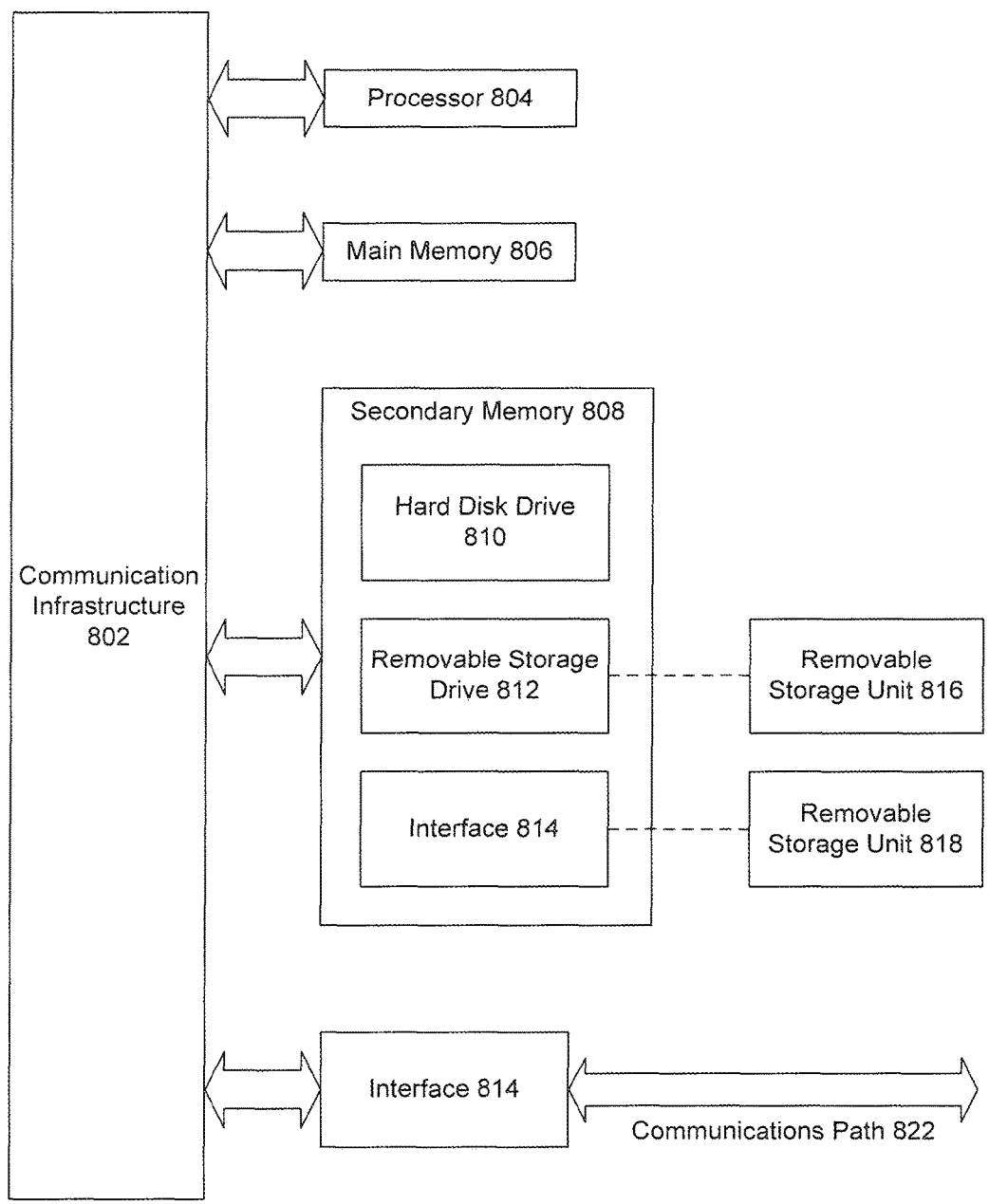
FIG. 8 illustrates a block diagram of a general purpose computer.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recited elements and their equivalents.

What is claimed is:

1. A base station, comprising:
    a radio configured to communicate with a plurality of subscribing user equipment (UEs); and
    a processor and/or one or more circuits, coupled to the radio, configured to:
        acquire data from the plurality of subscribing UEs and a target access point, wherein the plurality of subscribing UEs are UEs that are being serviced by the base station when the data is acquired, the data including information relating to at least one additional access point;
        determine, based on the data, whether offloading of one or more of the subscribing UEs should be performed; and
        generate a broadcast message that includes an offload command and surge prevention information for broadcast to the plurality of subscribing UEs based on the offloading determination, the surge prevention information including at least one condition or time constraint for preventing a surge of offloads from the base station.

2. The base station of claim 1, wherein the processor and/or the one or more circuits are further configured to broadcast the broadcast message to the plurality of subscribing UEs using a protocol predefined in a corresponding wireless communication standard.

3. The base station of claim 2, wherein the protocol is a System Information Block (SIB) protocol defined by a Long-Term Evolution (LTE) communication standard.

4. The base station of claim 1, wherein the processor and/or the one or more circuits are further configured to determine whether surge prevention should be employed during the offloading based on a number of subscribing UEs to be offloaded, and/or a load of the target access point, wherein the surge prevention prevents a large number of UEs from offloading within a small period of time.

5. The base station of claim 4, wherein the processor and/or the one or more circuits are further configured to, when it is determined that surge prevention should be employed, select a surge prevention technique for performing the surge prevention.

6. The base station of claim 5, wherein the processor and/or the one or more circuits are further configured to generate the broadcast message to include an indication of the selected surge prevention technique.

7. The base station of claim 1, wherein the processor and/or the one or more circuits are further configured to transmit sensitive security information of the target access point to the one or more subscribing UEs via dedicated signaling.

8. The base station of claim 7, wherein the processor and/or the one or more circuits are further configured to generate the broadcast message to include non-sensitive security information of the target access point.

9. A user equipment (UE), comprising:
    a first radio configured to communicate with a base station;
    a second radio configured to communicate with one or more wireless access points that use a different radio access technology than the base station; and
    a processor and/or one or more circuits, configured to:
        detect a broadcast notification from the base station using the first radio, and a broadcast message from the base station based on the broadcast notification;
        extract offload instructions and surge prevention information from the detected broadcast message, the surge prevention information including at least one condition or time constraint for preventing a surge of offloads from the base station; and
        reconfigure the second radio for communicating with a target wireless access point in accordance with the offload instructions and the surge prevention information.

10. The method of claim 9, wherein the surge prevention information is used as part of a surge prevention technique, wherein the surge prevention technique prevents a large number of UEs from offloading within a small period of time.

11. The UE of claim 9, wherein the broadcast notification is received via dedicated signaling and indicates a timing for transmission of the broadcast message by the base station.

12. The UE of claim 9, wherein the broadcast notification is received via dedicated signaling and the broadcast message is received via non-device-specific broadcast messaging.

13. The UE of claim 9, wherein the processor and/or the one or more circuits are further configured to receive security information of the target access point from the base station via dedicated signaling.

14. The UE of claim 13, wherein the processor and/or the one or more circuits are further configured to perform synchronization with the target access point utilizing the received security information.

15. The UE of claim 9, wherein the processor and/or the one or more circuits are further configured to set an offload time based on the surge prevention information included in the detected broadcast message.

16. The UE of claim 15, wherein the surge prevention information identifies, as a surge prevention technique, either an access class technique or a random distribution technique, and
    wherein, based on the identified surge prevention technique, the processor and/or the one or more circuits are further configured to set the offload time or determine not to offload based on surge prevention parameters included in the broadcast message that correspond to the identified surge prevention technique.

17. A method for offloading subscribing user equipment (UEs) from a base station, the method comprising:
    acquiring connection characteristics of a target access point;
    comparing the acquired connection characteristics with connection characteristics of the base station;
    determining, based on the comparing, whether one or more of the subscribing UEs should be offloaded to the target access point, wherein the subscribing UEs are UEs that are being serviced by the base station; and
    broadcasting a message capable of being received and deciphered by each of the one or more subscribing UEs,
    wherein the message includes connection information of the target access point, and offloading instructions,
    wherein the offloading instructions include a selected surge prevention technique and a corresponding parameter, the surge prevention technique and the corresponding parameter including at least one condition or time constraint for preventing a surge of offloads from the base station.

18. The method of claim 17, wherein the selected surge prevention technique either indicates a subset of subscribing UEs for offloading or a timing range from which the one or more subscribing UEs can calculate an offload time.

19. The method of claim 17, further comprising transmitting, prior to broadcasting, encrypted security information of the target access point.

20. The method of claim 19, wherein the encrypted security information is transmitted via dedicated signaling.

21. The method of claim 17, further comprising acquiring data from the one or more subscribing UEs,
    wherein the determining is performed based on the acquired data from the one or more subscribing UEs and the comparing.

* * * * *

UNITED STATES PATENT AND TRADEMARK OFFICE
CERTIFICATE OF CORRECTION

| | |
|---|---|
| PATENT NO. | : 9,723,536 B2 |
| APPLICATION NO. | : 14/156960 |
| DATED | : August 1, 2017 |
| INVENTOR(S) | : Wang et al. |

It is certified that error appears in the above-identified patent and that said Letters Patent is hereby corrected as shown below:

In Column 13, Line 64, replace "are further configured" with --are configured--.

Signed and Sealed this
Tenth Day of April, 2018

Andrei Iancu
*Director of the United States Patent and Trademark Office*